United States Patent [19]

Tanada

[11] 4,094,070
[45] June 13, 1978

[54] MICROMETER HEAD WITH DOUBLE COUNTER

[75] Inventor: Tetsunori Tanada, Kure, Japan

[73] Assignee: Kabushiki Kaisha Mitutoyo Seisakusho, Tokyo, Japan

[21] Appl. No.: 716,649

[22] Filed: Aug. 23, 1976

[30] Foreign Application Priority Data

Sep. 23, 1975   Japan .......................... 50-130623[U]

[51] Int. Cl.² ............................................. G01B 5/00
[52] U.S. Cl. .................................................... 33/166
[58] Field of Search ................ 33/166, 141 R, 164 R, 33/169 R, 172 R, 170

[56] References Cited

U.S. PATENT DOCUMENTS

| 3,793,733 | 2/1974 | Nishikata | 33/166 |
| 3,803,719 | 4/1974 | Nishina et al. | 33/172 R |

FOREIGN PATENT DOCUMENTS

| 230,727 | 4/1944 | Switzerland | 33/169 R |

*Primary Examiner*—Harry N. Haroian
*Attorney, Agent, or Firm*—Brisebois & Kruger

[57] ABSTRACT

A micrometer head with a double counter including a first digital counter for displaying the displacement of an axially movable spindle in the positive direction, and a second digital counter for displaying its displacement in the negative direction, which counters can give direct readings of the positive and negative displacements of the spindle.

2 Claims, 4 Drawing Figures

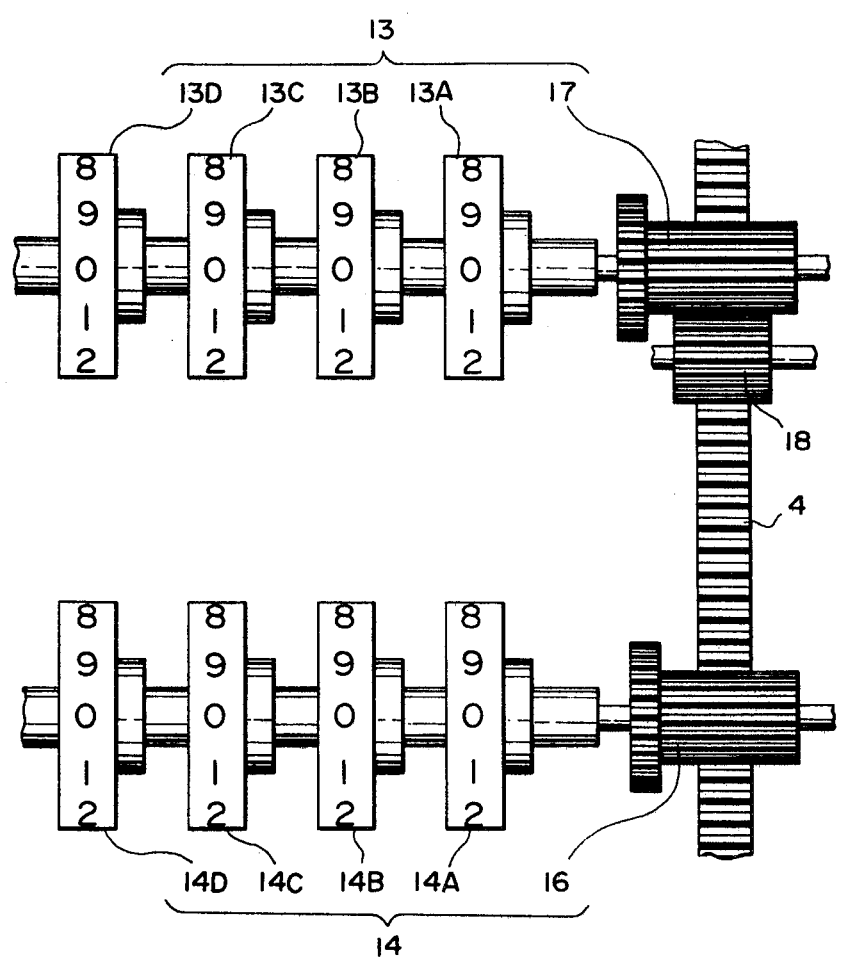

MICROMETER HEAD WITH DOUBLE COUNTER

BACKGROUND OF THE INVENTION

The present invention relates to a micrometer head with a double counter.

A micrometer head with a single digital counter which reads the positive and negative displacements of a movable spindle is presently known. In this micrometer head, the positive displacement of the spindle can be directly read, but its negative displacement cannot be directly read. Measurements using such a micrometer head are difficult to carry out, because the negative displacement of the spindle has to be calculated from a value indicated at a reference point on the counter and from an indication by the counter of the negative displacement of the spindle.

The present invention is an improvement on conventional micrometer heads with a single counter, characterized in that a counter for displaying the positive displacement of the spindle and a counter for displaying the negative displacement of the spindle are provided to enable direct reading of the positive and negative displacements of the spindle.

SUMMARY OF THE INVENTION

The first object of the present invention is to provide a micrometer head equipped with a counter for displaying the positive displacement of the spindle and a counter for displaying the negative displacement of the spindle.

The second object of the present invention is to provide a micrometer head in which the counter for displaying the positive displacement of the spindle is interlocked via an intermediate gear with a large gear integrated with the spindle, thereby making it possible to display the positive displacement of the spindle exactly.

The third object of the present invention is to provide a micrometer head in which the counter for displaying the negative displacement of the spindle is directly interlocked with a large gear integrated with the spindle, thereby making it possible to display the negative displacement of the spindle exactly.

Other objects of the present invention will become apparent from the following detailed description of one embodiment of the present invention, with reference to the attached drawings, in which:

FIG. 4 is a partial enlargement illustrating the relationship between the counter gear of the digital counters and a large gear.

Figure 1:
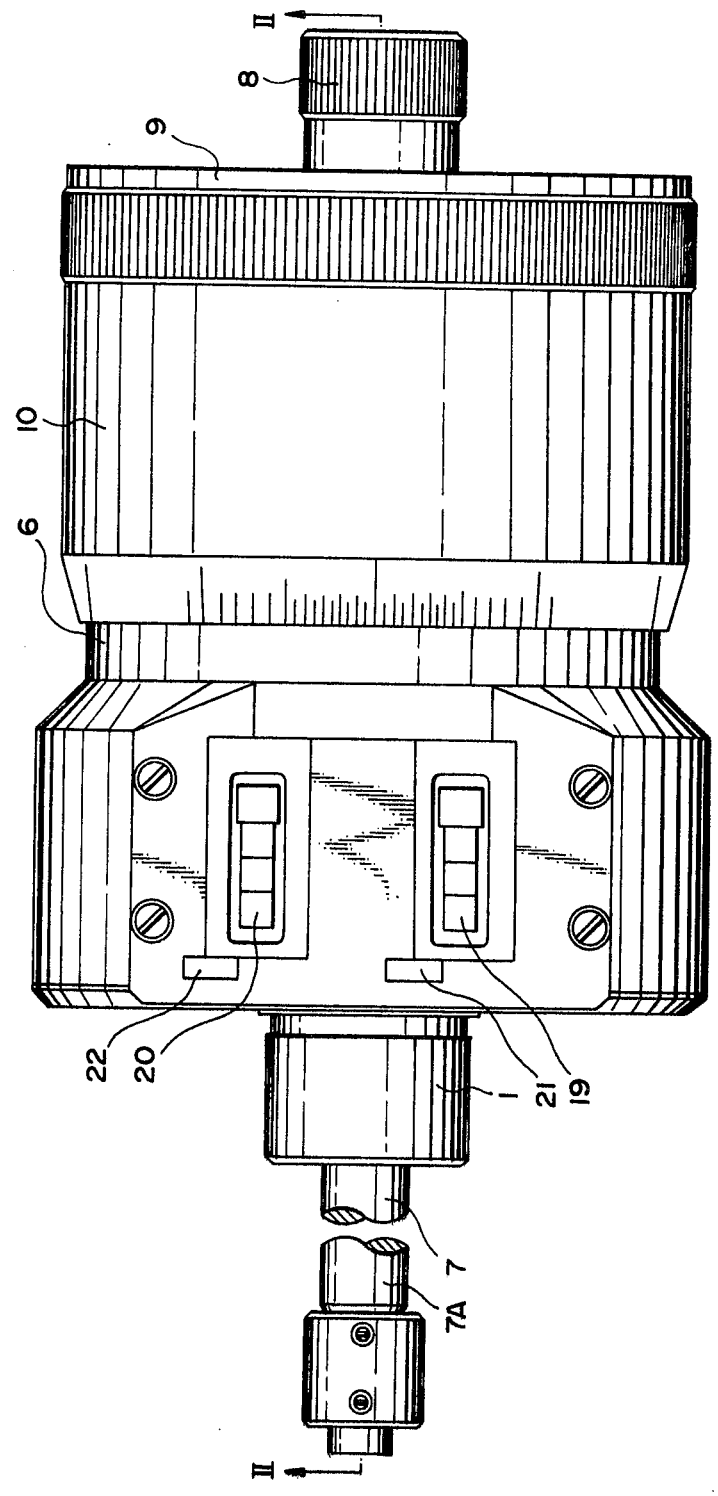
FIG. 1 is a front elevational view of one embodiment of the present invention.
Figure 2:
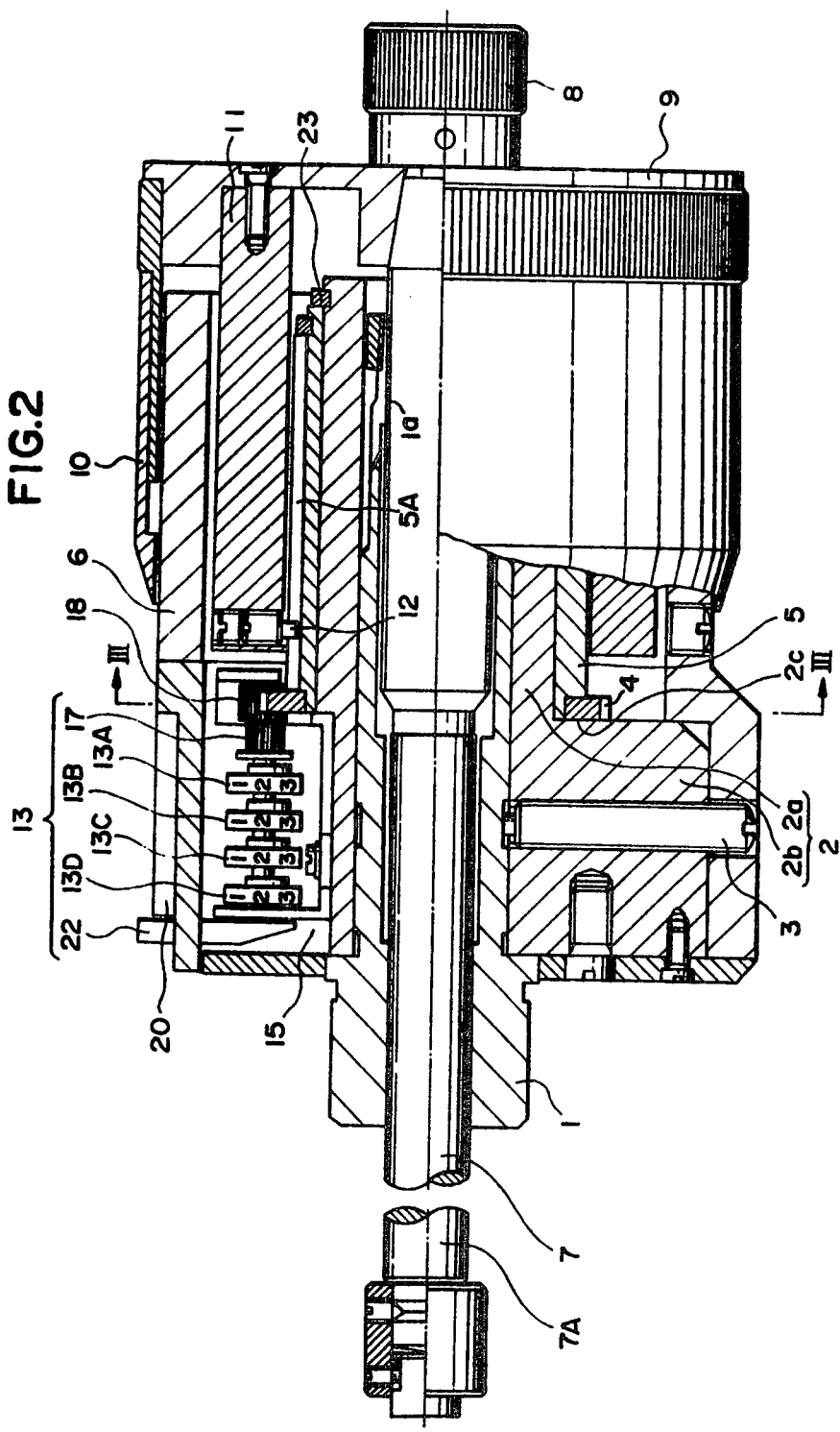
FIG. 2 is a partial sectional view taken along the line II—II of FIG. 1.
Figure 3:
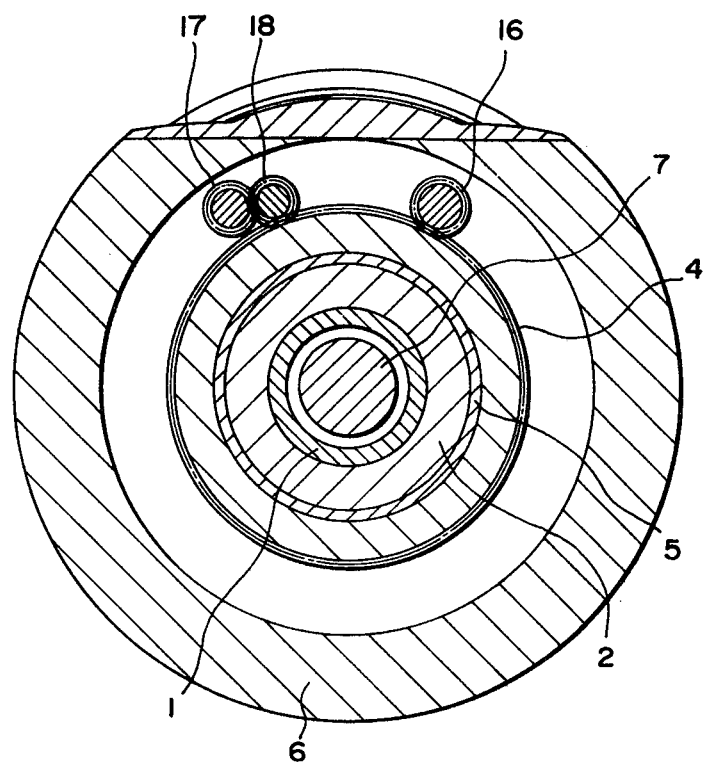
FIG. 3 is a sectional view taken along the line III—III of FIG. 1.

Referring to the attached drawings, in FIGS. 1, 2 and 3, a tubular collar support 2 is fastened on the outer surface of the tubular body 1 by means of a bolt 3. A collar 5 encircling said support has its axial displacement along the body 1 restricted by the step 2c between the large diameter part 2d and the small diameter part 2a of said collar support 2, and by the ring 23 fixed to the collar support 2. Thus the collar 5 is rotatable around the axis of the body 1. The small diameter part 2a of the collar support 2 rotatably supports the collar 5, which carries an integral large gear 4. One end of a sleeve 6 covering the outer surface of the collar 5 fits the large diameter part 2b of said collar support 2, and the sleeve 6 and said collar support 2 are fastened together by the bolt 3.

On the inner surface of the tubular body 1 there is a female screw 1a, which engages a male screw 7b of the spindle 7, whereby said spindle 7 is supported for axial movement within the body 1. One end 7A of the spindle 7 protrudes out of the body 1, while its other end carries a handling knob 8 and an end plate 9 in the shape of a disc fixed to a thimble 10, rotatably mounted to the outer surface of the sleeve 6. Reference numeral 11 indicates a tubular member loosely inserted between the inner surface of the sleeve 6 and the outer surface of the collar 5. The tubular member 11 and the thimble 10 are both fixed to the side plate 9. On the inner surface of the tubular member 11 is a projecting pin 12, while a groove 5A extends longitudinally along the outer surface of the collar 5 and the tip of the pin 12 fits into said groove.

Reference number 13 indicates a digital counter for displaying the displacement of one end 7A of the spindle 7 in a leftward direction (i.e., in the positive direction) and 14 indicates a digital counter displaying the displacement of the end 7A of the spindle 7 toward the body 1 (i.e., in the negative direction). Both these counters are installed within a cavity 15 between the collar support 2 and the sleeve 6 and they cannot protrude radially beyond said sleeve 6.

Reference numeral 16 indicates the counter gear of the digital counter 13, which counter gear meshes with the large gear 4. Reference numeral 17 indicates the counter gear of the digital counter 14, which counter gear 17 meshes via an idle gear 18 with the large gear 4. Reference numerals 13A, 13B, 13C and 13D indicate the dial wheels of the digital counter 13 with the number 0 – 9 indicated thereon circumferentially, wheel 13B makes one full turn for every 10 turns of 13A, 13C one full turn for every 10 turns of 13B, and 13D one full turn for every 10 turns of 13C. Reference numerals 14A, 14B, 14C and 14D indicate the dial wheels of the digital counter 14 with an arrangement similar to that of the counter 13. The digital counter 13 includes a display 19 and the digital counter 14 has a display 20. A reset button 21 is adapted to be pressed to return the indication of the digital counter 13 to zero. A reset button 22 is adapted to be pressed to return the indication of the digital counter 14 to zero.

The micrometer head described operates as follows:

Rotation of the knob 8 causes the spindle 7 to move axially, and the thimble 10 and the tubular member 11 move axially with the spindle 7.

Rotation of the tubular piece 11 turns the collar 5 via the pin 12 which engages the collar support 2, thereby causing the rotation of the large gear 4. Rotation of the large gear 4 results in a rotation of the counter gear 16 (FIG. 4) through the idle gear 18. Rotation of the idle gear 18 causes the counter gear 17 to turn in the opposite direction to that in which the counter gear 16 rotates. When the end 7A of the spindle 7 is moved away from the body 1 by mutually opposite rotation of the counter gears 16 and 17, i.e., when the spindle 7 moves in the positive direction, the dial wheels 13A – 13D of the digital counter 13 turn in a direction which increases the value exhibited by the display 19, while the dial wheels 14A – 14D of the digital counter 14 turn in a direction which decreases the value exhibited by the display 20.

The positive displacement of the spindle 7 may be read directly from the counter 13. When the spindle 7 is moved back into the body, i.e., when the spindle 7 is shifted in the negative direction, the above relationship is reversed and the negative displacement of the spindle 7 may be directly read on the display of counter 14.

Upon pressing the reset button 21 or 22, the indication at the display 19 or 20 will reset to zero. Since the counters 13, 14 are equipped with a zero-reset mechanism, the displacement of the spindle 7 from an arbitrary position can be read off.

As described above, in a micrometer head according to the present invention which is equipped with a digital counter for reading the displacement of the spindle in the positive direction, i.e., the direction in which the spindle moves out from the body, and with a digital counter for reading the displacement of the spindle in the negative direction, i.e., the direction of the spindle moves back into the body, the forward and backward displacements of the spindle can be directly read without calculation and measurements with the micrometer head can be swiftly carried out.

What is claimed is:

1. A micrometer head comprising:

a tubular body including a central sleeve fixed to the body and having an axial opening with female threads, a spindle having male threads engaging said female threads of the body, said spindle being movable axially of the body upon rotation of the spindle, said tubular body having a generally cylindrical exterior and defining chamber means between said spindle and said exterior, said spindle further comprising a circular end, and a tubular member secured to said end and extending axially into said body, said tubular member extending around said central sleeve, a gear within said body, and adjacent said chamber means, means restraining said gear from axial movement with respect to said body, a collar mounted for rotation with respect to said central sleeve and between said sleeve and said tubular member of the spindle, said gear being fixed to said collar for rotation with the collar, and drive means connecting said tubular member to said collar for rotating said collar in response to rotation of the tubular member and spindle, while permitting axial displacement of the spindle and tubular member with respect to the body, a first digital counter mounted in said chamber means to indicate the displacement of said spindle in a first direction relative to said body, said first counter having a zero-reset mechanism, a second digital counter mounted in said chamber means on the same side of the axis of the body as said first counter, to indicate the displacement of said spindle in a second direction relative to said body, said second counter having a zero-reset mechanism, gear means connecting said first counter to said gear for operating the first counter to indicate axial displacement of said spindle in a first direction with respect to said body, and second gear means connecting said second counter to said gear for operating the second counter to indicate axial displacement of said spindle in a second direction with respect to said body.

2. A micrometer head as claimed in claim 1, wherein said chamber means comprises two cavities formed between said sleeve and said cylindrical exterior of said tubular body, each cavity holding one of said digital counters, whereby each digital counter is wholly contained within said tubular body.

* * * * *